United States Patent

Saruwatari

[11] Patent Number: 5,912,705
[45] Date of Patent: Jun. 15, 1999

[54] IMAGE PROCESSING APPARATUS WITH FACILITY FOR EXTRACTING PORTIONS OF IMAGE SIGNALS

[75] Inventor: Hiroshi Saruwatari, Kawasaki, Japan

[73] Assignee: Canon Kabushiki Kaisha, Tokyo, Japan

[21] Appl. No.: 08/898,798

[22] Filed: Jul. 23, 1997

Related U.S. Application Data

[63] Continuation of application No. 08/416,184, Apr. 4, 1995, abandoned.

[30] Foreign Application Priority Data

Apr. 6, 1994 [JP] Japan .................................. 6-093051

[51] Int. Cl.$^6$ ............................ H04N 5/262; H04N 5/222
[52] U.S. Cl. ............................ 348/333; 348/240; 396/51; 396/296
[58] Field of Search ................... 396/51, 296; 358/448, 358/452, 453, 464, 462, 906, 909.1; 348/207, 222, 239, 240, 333, 334, 373, 374, 375, 376; H04N 5/222, 5/225, 5/262

[56] References Cited

U.S. PATENT DOCUMENTS

| | | | |
|---|---|---|---|
| 5,365,302 | 11/1994 | Kodama | 354/403 |
| 5,412,487 | 5/1995 | Nishimura et al. | 358/452 |
| 5,422,700 | 6/1995 | Suda et al. | 354/402 |
| 5,455,654 | 10/1995 | Suzuki | 354/402 |
| 5,541,655 | 7/1996 | Kaneda | 348/333 |
| 5,581,323 | 12/1996 | Suzuki et al. | 396/51 |

Primary Examiner—Wendy Garber
Assistant Examiner—Ngoc-Yen Vu
Attorney, Agent, or Firm—Robin, Blecker & Daley

[57] ABSTRACT

A photographing apparatus includes optical means for forming an object image, converting means for converting the object image into an image signal, displaying means for displaying an image on the basis of the image signal, designating means for designating an area in the displaying means, and recognizing means for extracting and recognizing a character in the image of the area.

2 Claims, 8 Drawing Sheets

IMAGE PROCESSING APPARATUS WITH FACILITY FOR EXTRACTING PORTIONS OF IMAGE SIGNALS

This is a continuation application under 37 CFR 1.62 of prior application Ser. No. 08/416,184, filed Apr. 4, 1995, now abandoned.

BACKGROUND OF THE INVENTION

1. Field of the Invention

This invention relates to a photographing apparatus, and for example, to a photographing apparatus designed such that a character area is set on the basis of visual axis information from visual axis detecting means for detecting a photographer's visual axis and from among image signals obtained from image taking means, character recognizing process is effected with regard to an image signal corresponding to the character area.

2. Related Background Art

In recent years, the development of an optical character recognition (OCR) apparatus as an apparatus for directly inputting printed characters as character information to a computer or the like has taken place. This OCR apparatus reads a printed original (object) by an image scanner (converts it into an image signal), recognizes characters from the image signal obtained by the image scanner and converts them into character information capable of being recomposed as a sentence (hereinafter simply referred to as the character recognizing process). Such an apparatus can process two-dimensional image information such as characters on the surface of paper, but with regard to an object having a depth direction, it is necessary to once photograph it by a camera or the like and convert it into planar image information, and thereafter read it by the image scanner and subject it to the character recognizing process and therefore, this apparatus is cumbersome to operate.

On the other hand, with the tendency of image taking elements toward a higher degree of minuteness, photographing apparatuses such as video cameras and still cameras have come to be used as information inputting means to computers or the like, in addition to their use for commemorative photographing with landscape and persons as objects. A video camera or a still camera is used as information inputting means and an image signal is directly subjected to a character recognizing process, whereby it becomes easy to extract character information from among objects having a depth direction.

However, there has been the problem that if the character recognizing process is effected on the entire image field when the character recognizing operation is to be performed, very much time will be taken for a pre-process such as the extraction of character portions and for example, when this apparatus is applied to an electronic camera or the like, it is difficult to meet the requirement of a user asking for the instantaneousness of photographing.

To solve this problem, the ability of a calculation unit for effecting the character recognizing process could be improved, but it would result in expensiveness of the system.

Also, in the case of an object in which a natural picture such as landscape and characters are mixedly present, or in a case where it is desired to extract only some necessary characters from a great deal of character data, it is unnecessary to effect the character recognizing process in the whole area of the image field.

When for such an object, the character recognizing process is to be effected only on some areas thereof, an image signal once photographed and recorded on a medium is re-inputted to an information processing terminal such as a work station, and moreover an area is designated by the use of a mouse or a keyboard, whereafter the character recognizing process is effected, and this has led to the problem that the entire apparatus becomes bulky and complicated.

Further, when the amount of information of an object is overwhelmingly great for the number of pixels of an image taking element, no drastic solution will be achieved unless a part of the image field is enlargedly photographed and then character recognition is done, and this has also led to the problem that it is difficult to improve the accuracy of recognition.

SUMMARY OF THE INVENTION

It is an object of the present invention to provide a photographing apparatus (camera) having the function of effecting character recognition.

It is also an object of the present invention to provide a photographing apparatus designed to set a desired small area in the viewfinder of the camera and be capable of character-recognizing the image of the area.

An image taking element 3 (FIG. 1) has a great number of pixels, i.e., high resolution, as compared with displaying means 17 such as an LCD. Accordingly, in the displaying means, it becomes possible that even such characters that cannot be recognized as characters by an observer are recognized relatively accurately and easily by the image signal of the image taking element being signal-processed.

DESCRIPTION OF THE PREFERRED EMBODIMENTS

Figure 1:
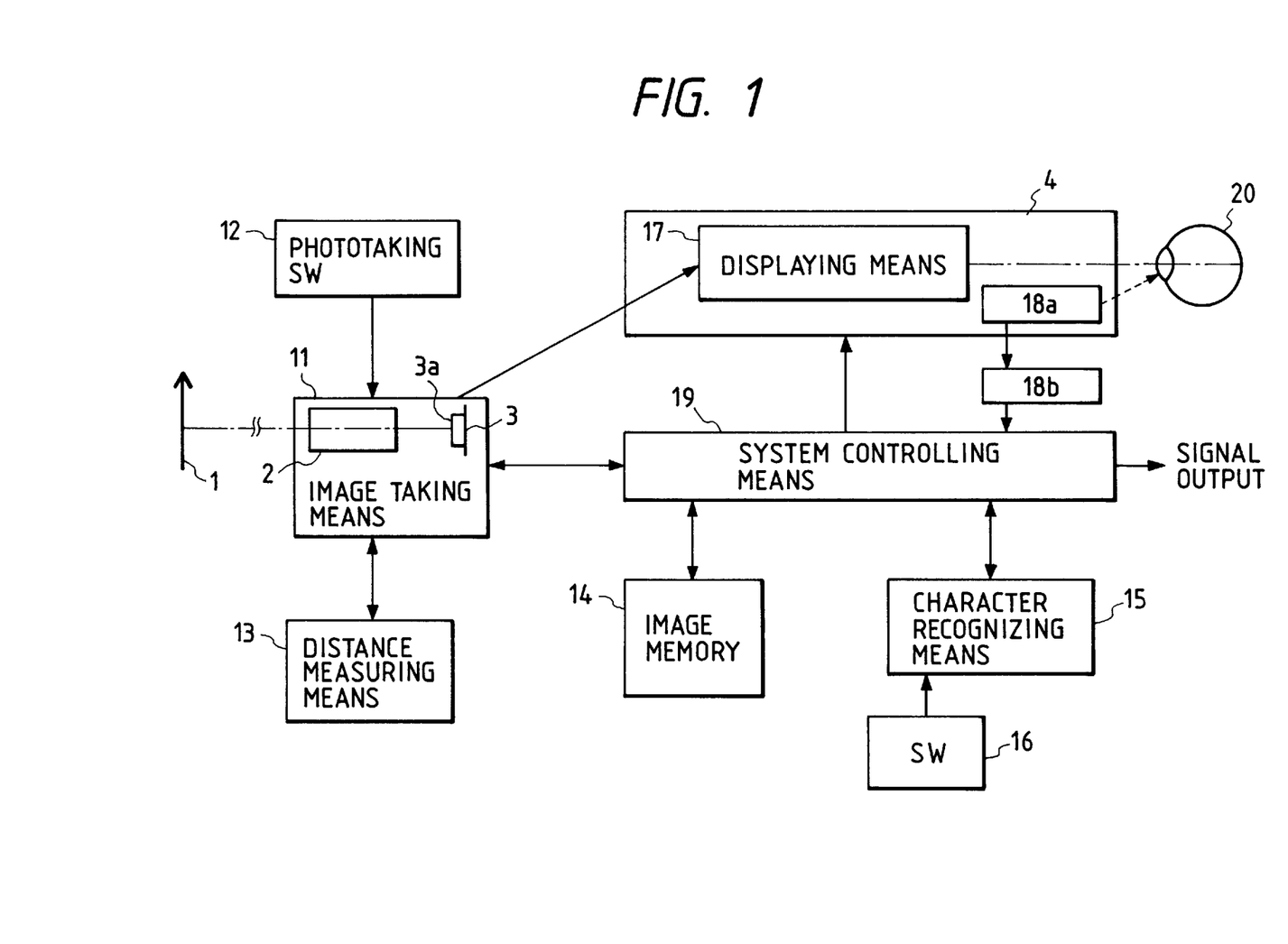
FIG. 1 is a schematic diagram of the essential portions of Embodiment 1 of the present invention.

FIG. 1 is a block diagram of the essential portions of the photographing apparatus of the present invention. In FIG. 1, the reference numeral 11 designates image taking means which forms a beam of light from an object 1 into an optical image on the light receiving surface 3a of an area type image taking element (light receiving element) 3 such as a CCD by imaging means 2. The image taking element converts the image of the object into an image signal.

The reference numeral 12 denotes a phototaking switch which instructs the image taking means 11 to start photographing. The reference numeral 13 designates distance measuring means which measured the distance to the object 1 on the basis of the signal of the image taking element. The reference numeral 14 denotes an image memory temporarily storing therein the image signal obtained by the image taking means 11, through system controlling means 19.

The reference numeral 15 designates character recognizing means having a recognition program and reference character data, and it obtains predetermined one of image signals photographed by the image taking means 11 through the system controlling means 19 and effects a character recognizing process. The reference numeral 16 denotes a character recognizing switch which instructs the character recognizing means to start the character recognizing process. The reference numeral 17 designates displaying means which displays an image based on the image signals photographed by the image taking means 11 or an image after the character recognizing process.

The reference character 18a denotes conventional visual axis detecting means which detects the angle of rotation of the eyeball 20 of a photographer observing the image displayed on the displaying means 17 and obtains the visual axis information of the photographer. The reference character 18b designates area designating means which designates a character area in the image on the basis of the visual axis information from the visual axis detecting means 18a.

The displaying means 17 and the visual axis detecting means 18a together constitute an element of a finder system 4. The image taking element 3 has a great number of pixels, i.e., high resolution, as compared with the displaying means such as an LCD.

The system controlling means 19 has a central processing unit for generally effecting the control of processes such as the driving of the image taking means 11, the inputting and outputting of character information and image signals, and the separation of an image signal based on a character area from an image signal based on an entire phototaking area (hereinafter simply referred to as the area separation).

The present embodiment photographs an object in which natural pictures and characters are mixedly present or an object having a great deal of characters, designates an area having a character to be subjected to the character recognizing process (hereinafter simply referred to the character area) of the photographed areas, and effects the character recognizing process for not all the image area to be displayed but only image signal corresponding to the character area thereby achieving the higher speed and higher accuracy of character recognition. At this time, the designation of the character area is effected at the stage of determining the composition while looking at the displaying means 17 during photographing, by the use of the visual axis information from the visual axis detecting means 18a.

Figure 2:
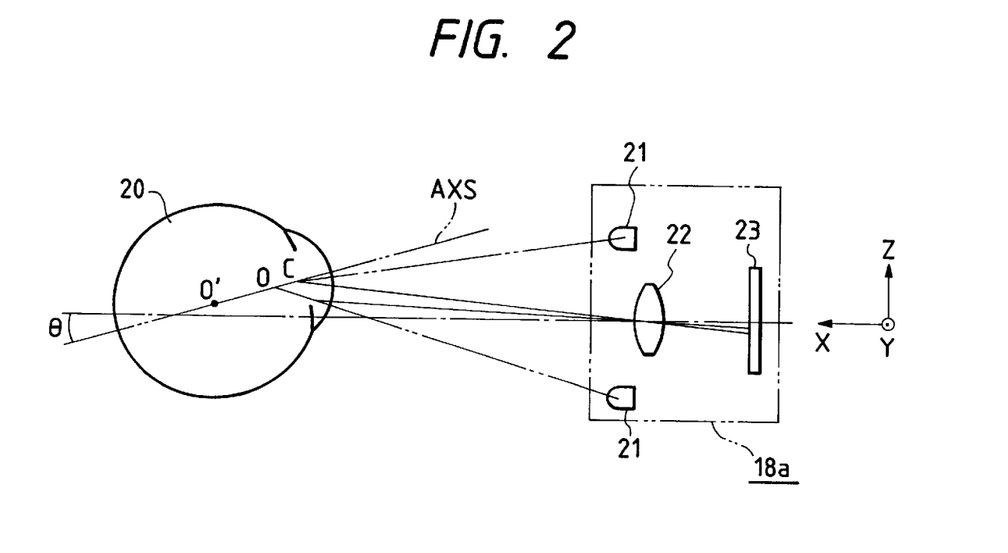
FIG. 2 is a schematic view of visual axis detecting means.

The visual axis detecting means 18a is constructed as shown, for example, in FIG. 2. In FIG. 2, the reference numeral 21 designates an infrared diode (IRED) as an illuminating light source for illuminating the photographer's eyeball 20, and the reference numeral 22 denotes an imaging lens for directing the reflected light from the eyeball 20 onto the light receiving surface of an image sensor 23 and forming the reflected image of the eyeball 20.

The visual axis detecting means 18a divergently illuminates the eyeball 20 of the photographer observing the image displayed on the displaying means 17, by the IRED 21, directs the reflected light from the eyeball 20 onto the image sensor 23 by the imaging lens 22, and forms the reflected image of the eyeball 20.

At this time, the angle of rotation θ of the optical axis AXS of the eyeball 20 can be determined from a geometrical calculation on the basis of the coordinates of the reflected image of the eyeball 20 formed on the image sensor, particularly the image by the reflected light from the cornea and iris, and there is obtained visual axis information such as the photographer's visual axis, the direction and speed of movement of the visual axis, and winking.

In the present embodiment, the displaying means 17 is comprised, for example, of a liquid crystal panel and the visual axis detecting means 18a together constitute an element of the finder system 4 of the camera, and design is made such that the observer observes the image on the displaying means 17 from a predetermined eye contact portion (e.g. an eyepiece). Accordingly, the positional relation between the image and the observer's eyeball 20 is determined and the direction of the photographer's visual axis is detected by the visual axis detecting means 18a, whereby the gazing point on the image is obtained.

The movement or the like of the visual axis is then effected so that the photographer may designate a character area while observing the image on the displaying means 17, and the visual axis information at this time is inputted to the area designating means 18b. When it is desired to specify a certain gazing point during the designation of the character area, it may be done as by gazing at a desired point for a predetermined time or winking at a desired point, or design may be made such that a point being gazed at is specified in conformity with the input of sound or an input signal from an input switch.

The operation of the present embodiment will now be described with reference to FIGS. 3, 4A, 4B and 4C.

Figure 3:
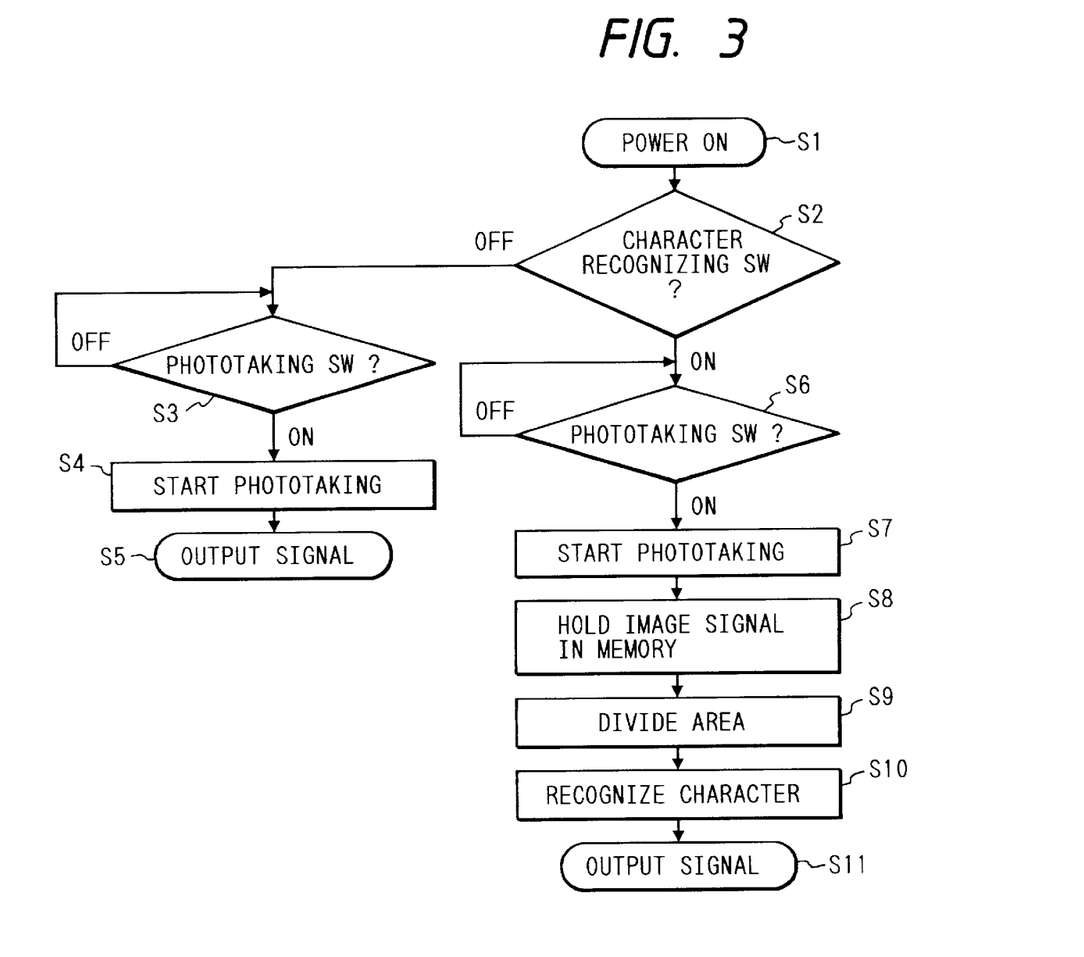
FIG. 3 is a flow chart of Embodiment 1 of the present invention.

In the flow chart of FIG. 3, when the power source switch of the system is closed (S1), the initialization of the image taking means 11, the image memory 14, etc. is effected, whereafter the mode of the character recognizing switch 16 is read (S2).

If at the step S2, the character recognizing switch 16 is OFF, a standby state for phototaking (S3) is entered, and as in an ordinary video camera or the like, the phototaking by the phototaking means 11 is started (S4) when the phototaking switch 12 is closed, and the image signal is outputted to other apparatus (not shown) such as a recording apparatus (S5).

The image signal outputted to the displaying means 17 at this time and the image signal obtained through the system controlling means 19 are just the same.

On the other hand, if at the step S2, the character recognizing switch 16 is ON, a standby state for phototaking (S6) is entered, and when the phototaking switch 12 is closed, the phototaking by the image taking means 11 is started (S7). The image signals from the image taking means 11 are temporarily written into the image memory 14 (S8).

Subsequently, the photographer's visual axis information is detected by the visual axis detecting means 18a, and on the basis of this visual axis information, the character area is set by the area designating means 18b. Of the image signals stored in the image memory 14 by the system controlling means 19, some image signal corresponding to the character area is separated (S9), and thereafter is inputted to the character recognizing means 15 to thereby effect the character recognizing process (S10), and character information is obtained and respective signals (the image signals and character information) are outputted from the system controlling means 19 (S11).

Figure 4A:
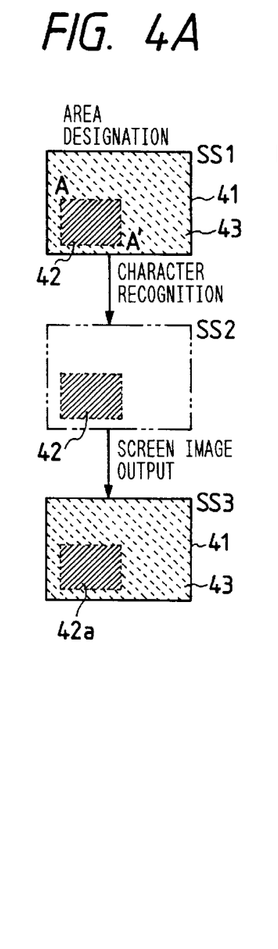
FIGS. 4A, 4B and 4C are illustrations of the image processing according to a character recognizing process.

The designation of the character area and the processing of the image will now be described in detail with reference to FIG. 4A. In FIG. 4A, the reference numeral 41 designates an image (within a solid-line rectangle) when the image signal of the entire phototaking area is displayed on the displaying means 17, the reference numeral 42 denotes a character area (a rightwardly upwardly hatched portion) of the image 41 which is the object of the character recognizing process, and the reference numeral 43 designates an area (a leftwardly upwardly hatched portion, which will hereinafter be referred to as the background area) of the image 41 which is not the object of the character recognizing process.

The designation of the character area in the present embodiment is effected by the observer first gazing at a corner A of the area which is the object of processing, switching on gazing point input means such as a button switch to specify a gazing point A.

Likewise, the observer gazes at a point A' diagonal to the point A in the area which is the object of processing, closes the button switch to thereby specify a gazing point A', and inputs visual axis information concerning these gazing points A and A' to the area designating means 18b.

The area designating means 18b uses as the character area 42 the rectangular area having the gazing points A and A' as vertices, on the basis of the visual axis information (SS1).

By the system controlling means 19, the image signal corresponding to the designated character area 42 is then read out of the image memory 14 and the area separation is effected (SS2).

The image signal of the separated character area 42 is inputted to the character recognizing means 15, and the character recognizing process such as pattern matching is effected, whereby character information is obtained. By thus signal-processing the signal of that area of the image taking element which corresponds to the designated area in the displaying means 17, it becomes possible to recognize a character accurately and easily.

This character information is inputted to the system controlling means 19 and is outputted to other apparatus such as a recording apparatus (not shown) and also, this character information and the image signal of the background area are combined together by combined image forming means in the system controlling means 19, and the image of the character area 42 is replaced with an image 42a based on the character information, and the image 42a is displayed on the displaying means 17 (SS3).

It is also possible to input the recognized character to a terminal computer, not shown, to thereby use it in the editing operation by a personal computer.

In the present embodiment, a character area is designated during phototaking by the use of the photographer's visual axis information, whereby the mitigation of the calculation amount of the character recognizing process, i.e., the shortening of the image introducing time, can be achieved and moreover, the background is not wrongly recognized as a character and therefore, information inputting as desired by the photographer is made possible.

Figure 8A:
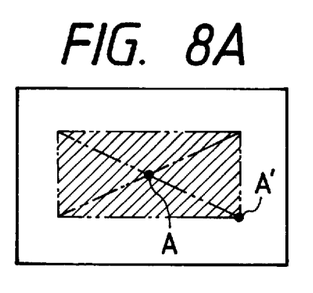
FIGS. 8A, 8B, 8C, 8D, 8E, 8F, 8G and 8H are illustrations of a technique of designating a character area.
Figure 8B:
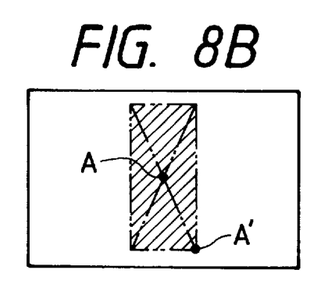
Figure 8C:
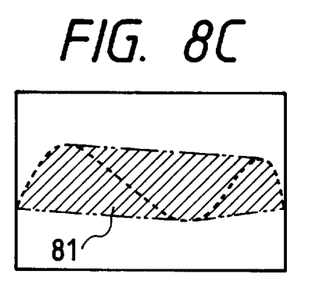
Figure 8D:
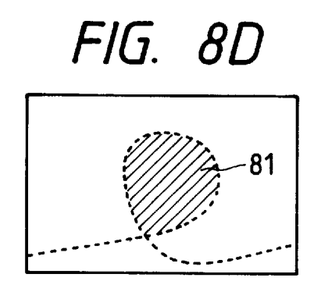
Figure 8E:
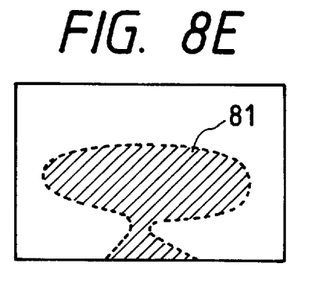
Figure 8F:
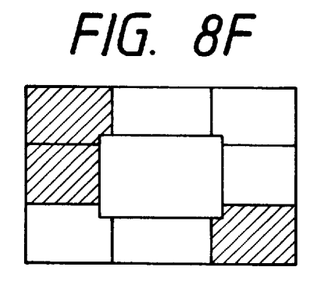
Figure 8G:
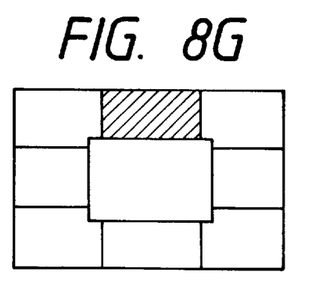
Figure 8H:
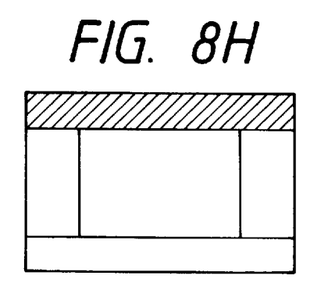

Also, in the present embodiment, the two diagonal points are designated whereby the rectangular character area is designated, whereas the designation of the character area is not restricted thereto, but may be effected by inputting the corner A' of the object area by the use of the visual axis information to thereby designate as the character area a rectangular area having the center of the phototaking area (which corresponds to the optical axis of the phototaking optical system) as the center point A and the corner A' as a vertex (FIGS. 8A and 8B), or by pursuing the movement of the photographer's visual axis and designating as the character area an area 81 (hatched portion) encircled by the movement focus (broken line) (FIGS. 8C, 8D and 8E), or by dividing the phototaking area into a plurality of areas, and gazing at one or more of the divided areas for a predetermined time or longer to thereby designate the character area (if not designated the central portion may be the character area) (FIGS. 8F, 8G and 8H).

Also, the character area designated by the area designating means 18b is reversed and displayed on the image 41 displayed on the displaying means 17, whereby the character area can be easily confirmed on the displayed image and the designation of the character area can be accurately done.

Further, in the present embodiment, besides inputting the output signal after the combination of images to a recording medium, it is also possible to input it again to the displaying means, and as a result, for example, the visualization of unclear characters or the like which cannot be recognized by human eyes, by real-time processing, becomes possible, and this can be aid to sight. Also, such characters may be translated into other language and displayed when they are to be displayed again on the displaying means.

Besides this, design may be made such that of the recognized character information, in definite characters are displayed by reversed characters or the like and the indefinite characters are gazed at and another candidate is displayed, or that the indefinite characters (including wrongly recognized characters) are designated by the use of the photographer's visual axis information and further magnified rephototaking is effected, or that a change or the like of punctuation when grammatical information is used in the character recognizing process is designated by the use of the visual axis information, whereby the character recognizing process can be effected more accurately.

Figure 4B:
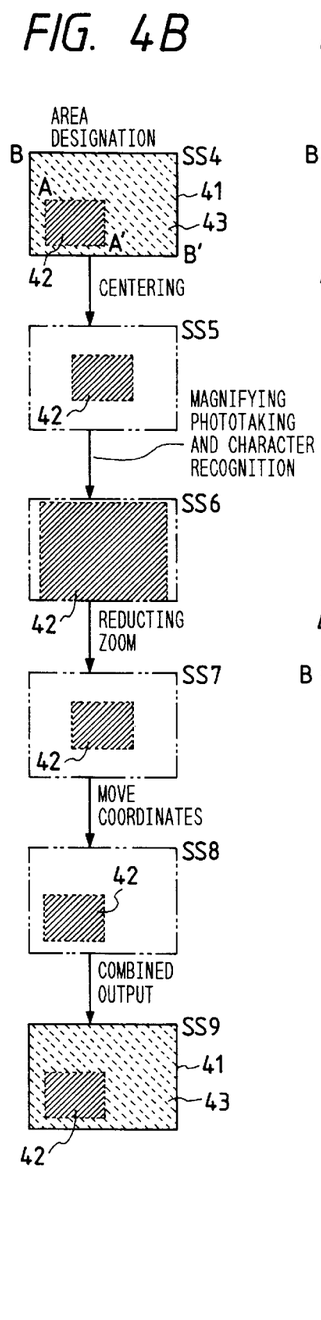

Embodiment 2 of the present invention will now be described with reference to FIGS. 4B, 5 and 6. This embodiment differs from Embodiment 1 of FIG. 1 in that an imaging optical system having the zooming function is used to effect zooming in conformity with a character area and phototaking is effected again, whereby good character recognition can always be done, and is substantially the same as Embodiment 1 in the other points.

In the present embodiment, the zooming of the imaging optical system in the image taking means is effected in conformity with the proportion the designated character area occupies in the whole image field (phototaking area) to thereby vary the imaging magnification (phototaking magnification) of an object image formed on the light receiving surface of the image taking element, whereafter rephototaking is effected. An image signal based on the zoom-phototaken character area is subjected to the character recognizing process and obtained as character information.

This character information is then processed so as to assume its original size and is outputted to other apparatus and also is combined with the image of the background, and is displayed on the displaying means.

Figure 5:
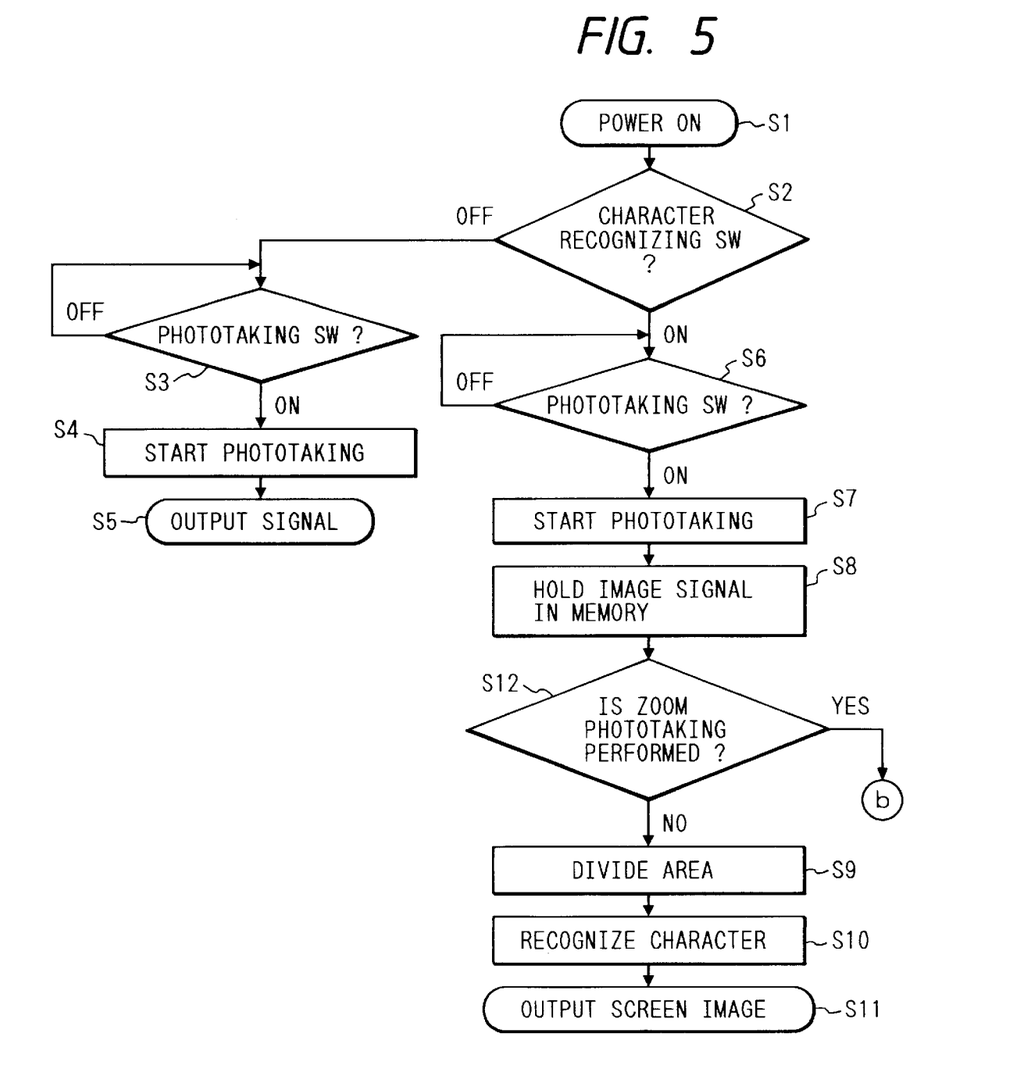
FIG. 5 is a flow chart of Embodiment 2 of the present invention.
Figure 6:
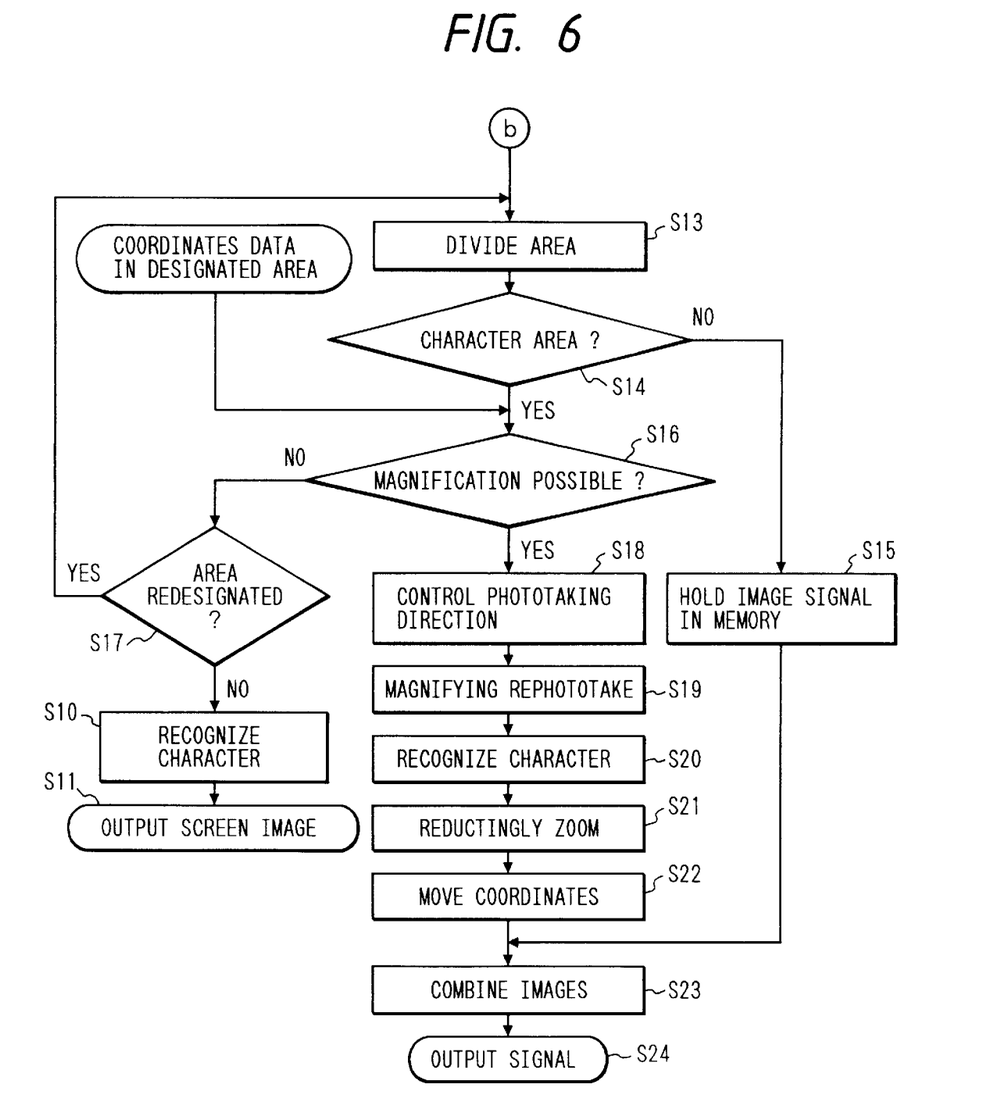
FIG. 6 is a flow chart of Embodiment 2 of the present invention.

FIGS. 5 and 6 are flow charts showing the present embodiment. In FIGS. 5 and 6, the same steps as those in Embodiment 1 of FIG. 3 are given the same reference characters and need not be described again.

The power source switch of the system is first closed and the initialization of each element is effected, whereafter if the character recognizing switch 16 is OFF, phototaking is effected as in an ordinary video camera or the like (S1–S5).

On the other hand, if at the step S2, the character recognizing switch 16 is ON and zoom phototaking is not done, phototaking is effected by the image taking means as in FIG. 3 and a character area is designated, whereafter the character recognizing process is effected and respective signals (such as character information and a combined image signal) are outputted from the system controlling means 19 (S6–S12).

When at the step S12, a mode for effecting zoom phototaking is selected, at a step S13, a character area is set by the use of the visual axis detecting means 18a and the area designating means 18b, and the image signal stored in the image memory 14 by the system controlling means 19 is separated into a character area and a background area.

At a step S14, image signals concerning the character area and the background area are sorted, and the image signal concerning the background area is recorded in the memory (S15) and the image signal concerning the character area, together with the coordinates data of the character area in the phototaking area, is used for the subsequent process.

Then, at a step S16, the character area and the phototaking area are compared with each other, and the phototaking magnification is determined so as to zoom (magnify) the character area to the same degree as the phototaking area, and whether magnifying phototaking is possible is judged, and is magnifying phototaking is impossible, an alarm is given to the photographer, thus pressing the photographer for the selection as to whether the character area should be redesignated (step S17).

If at the step S17, the character area is not redesignated, the image signal concerning the character area is subjected to the character recognizing process as previously described, whereafter it is outputted (S10 and S11). If the character area is redesignated, return is made to the step S13.

On the other hand, if at the step S16, magnifying phototaking is possible, the optical axis of the imaging optical system is moved so that the character area may lie substantially at the center of the phototaking area (S18), and the character area is magnified and rephototaken (S19).

An image signal obtained by the rephototaking is then subjected to the character recognizing process to thereby obtain character information (S20), which is then processed so as to assume its original size (the size equal to that phototaken at the step S7) (S21), whereafter on the basis of the aforementioned coordinates data, it is combined with the background area stored in the memory at the step S15 (S23) and is displayed on the displaying means 17 and also, each signal is outputted to other apparatus (S24).

Description will now be made of the image processing when zoom phototaking is done. In FIG. 4B, when the designation of the character area 42 is done, the phototaking magnification is determined and also, area separation is effected and the other background area 43 than the character area 42 is again recorded in the memory (SS4).

On the other hand, calculation for centering is effected from the then phototaking magnification and the coordinates of the character area 42, and the phototaking direction (the direction of the optical axis of the imaging optical system) is controlled so that the character area 42 may come to the center of the image field (SS5).

The zoom control of the imaging optical system is then effected so that the previously obtained phototaking magnification may be reached, whereafter only the character area 42 is magnified and rephototaken and the character recognizing process is effected (SS6).

The character information obtained by the character recognizing process is then reduction-zoomed so as to coincide with the background image, and is returned to its original coordinates and combinedly outputted (SS7 to SS9).

At this time, the background area held in the image memory and the rephototaken character area differ from each other in the direction of the optical axis in which phototaking has been done and therefore, use may be made of an image processing technique for correcting that. Thereby, a more natural output image will be obtained.

Phototaking direction controlling means for magnifying and rephototaking the marginal portion of the phototaking area may be any means which corresponds to the coordinates data of the image signal in the phototaking area which has been previously obtained, such as means for shifting and tilting an optical element constituting the imaging optical system, means for shifting the phototaking element, automatic control means using a pan head or means manually operated by the photographer.

In the present embodiment, the character area is designated, and is magnified and again phototaken as required, whereby a highly minute image signal is always obtained and therefore, as compared with the prior art in which complicated image processing was required on a computer terminal when the degree of minuteness of an image signal was insufficient, highly accurate character information can be obtained by a simple construction.

Embodiment 3 of the present invention will now be described. In this embodiment, the positional reproducibility of the character area in the image field is not required, and an image based on character information is displayed at a predetermined position on the displaying means without being returned to its original position after subjected to the character recognizing process.

Figure 4C:
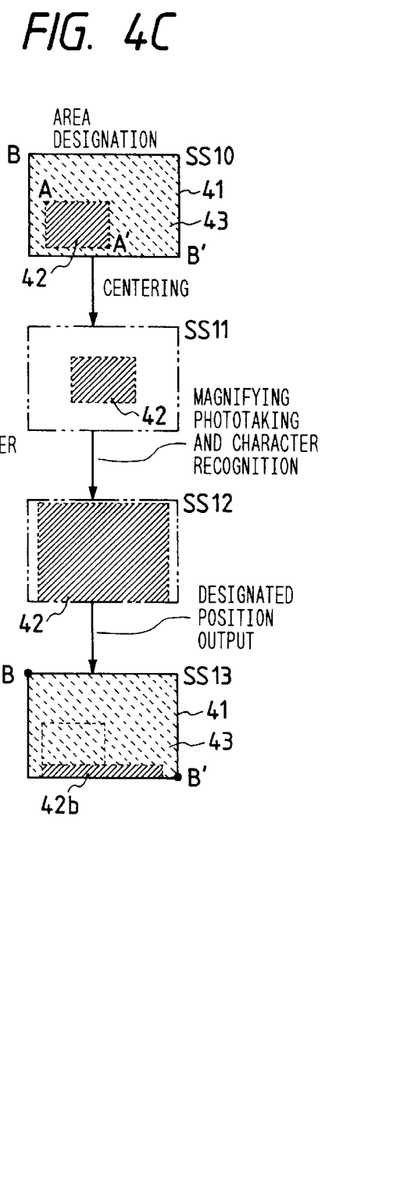

The present embodiment will hereinafter be described with reference to FIG. 4C. In the present embodiment, up to the stage at which the character area is designated and is magnified and rephototaken, whereafter it is subjected to the character recognizing process is substantially the same as Embodiment 2 of FIG. 4B.

In the present embodiment, the recognized character information is displayed on a predetermined portion of the image field. In FIG. 4C, a displaying area exclusively for characters is provided in the lower portion of the image field, whereby required characters can be obtained just like superimposition in a motion picture.

In the present embodiment, the image after subjected to the character recognizing process is displayed at a predetermined position (such as a position which does not hinder the display of landscape or the like, or a position other than the phototaking area) and therefore a more natural output image can be obtained and moreover, the area in which characters are displayed is predetermined and thus, the obtainment of characters is easy.

Further, any calculation regarding the positional information (coordinates data) in the image field is not required and as the entire processing, a higher speed is achieved.

Figure 7:
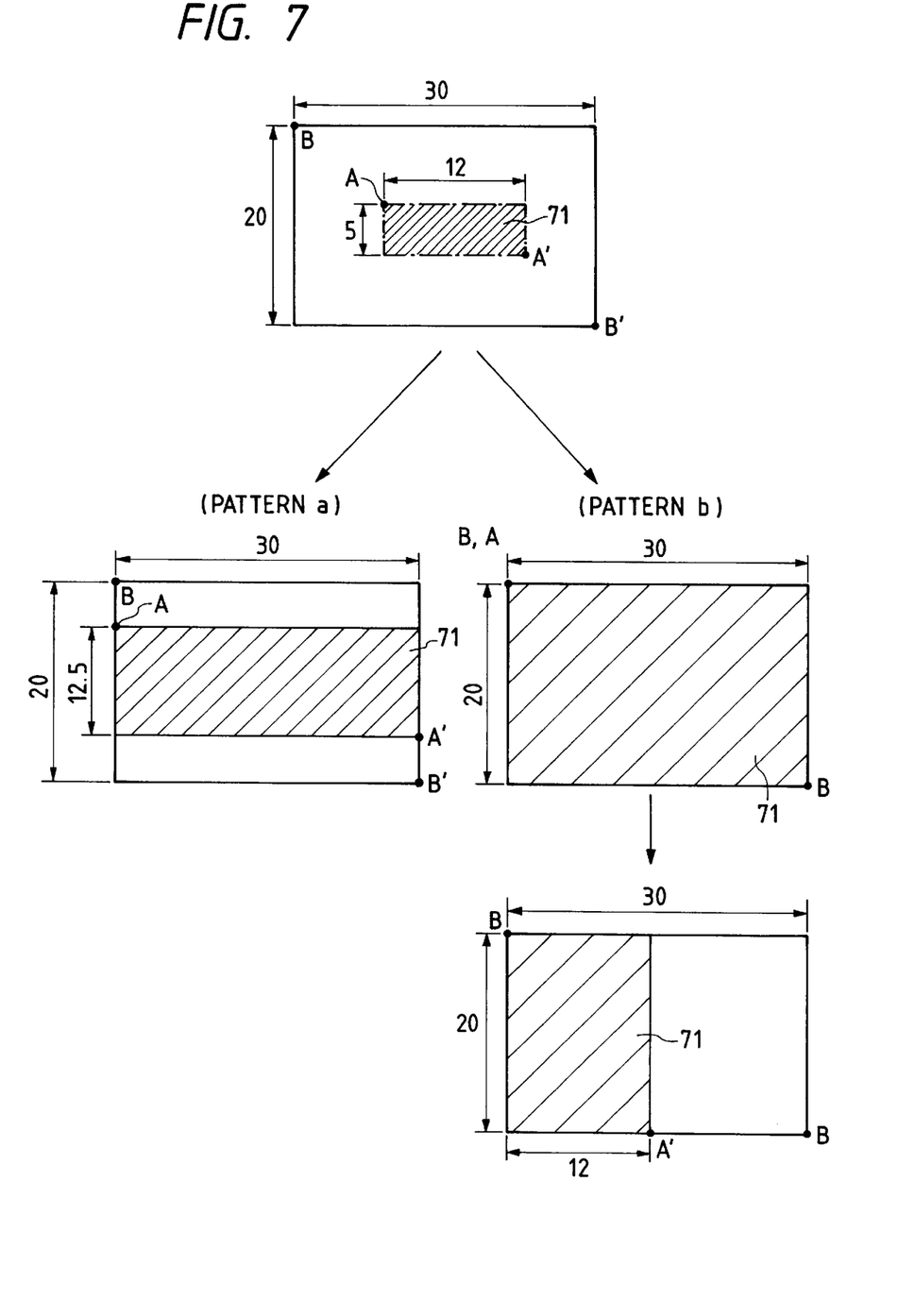
FIG. 7 is an illustration of zoom phototaking.

In the above-described embodiments, the designated character area 71 (hatched portion in FIG. 7) is magnified to such a degree that it falls within the phototaking area, and is rephototaken (the pattern a of FIG. 7), whereas the present invention is not restricted thereto, but the designated character area may be magnified so as to be phototaken a plurality of times (e.g. the pattern b of FIG. 7).

Also, in the above-described embodiment, the photographer designates a character area while looking at the image displayed on the displaying means, whereas the present invention is not restricted thereto, but if an image signal to be subjected to the character recognizing process can be specified from the positional relation between the phototaking area and the photographer's field of view, design may be made such that a character area is designated by the use of an optical type finder or the like having visual axis detecting means.

Further, the zoom phototaking after the character area has been designated is not limited to magnifying phototaking, but for example, the character area may once be magnified and designated, and then may be zoomed toward the reduction side and rephototaken.

The designation of the character area may be done over a wide range while the phototaking direction is changed, and the character area designated over the wide range may be phototaken a plurality of times or may be zoomed toward the reduction side and phototaken so that the character area may fall within the phototaking area, whereby the elaborate designation of the character area can be accomplished easily and the higher speed of the entire processing is achieved.

In the present invention, characters to be subjected to the character recognizing process may be symbols and figures (such as so-called pictorial symbols, foreign languages and ruled lines) if they can be converted into character information.

According to the present invention, there can be achieved a photographing apparatus in which a character area is set on the basis of the photographer's visual axis information, and of image signals obtained by the image taking means, an image signal corresponding to the character area is subjected to the character recognizing process, thereby achieving the higher accuracy and higher speed of character recognition.

What is claimed is:

1. An image processing apparatus comprising:

optical means for forming an object image;

converting means for converting the object image into an image signal;

displaying means for receiving said image signal and displaying said object image;

visual axis detecting means for detecting visual axis of an operator in relation to said displayed object image;

designating means for designating a portion of said displayed object image in accordance with visual axis of the operator detected by said visual axis detecting means;

recognizing means for recognizing a character by signal-processing a portion of said image signal corresponding to the designated portion of said displayed object image, said recognizing means recognizing the character using a pattern matching process.

2. An image processing apparatus according to claim 1, further comprising image magnification means for enlarging the designated portion of said displayed object image and wherein said recognizing means signal-processes said portion of said image signal resulting from the enlarging.

* * * * *